Feb. 21, 1933.　　　　F. W. GREER　　　　1,898,829
TEMPERING DEVICE
Filed April 25, 1930　　　3 Sheets-Sheet 2
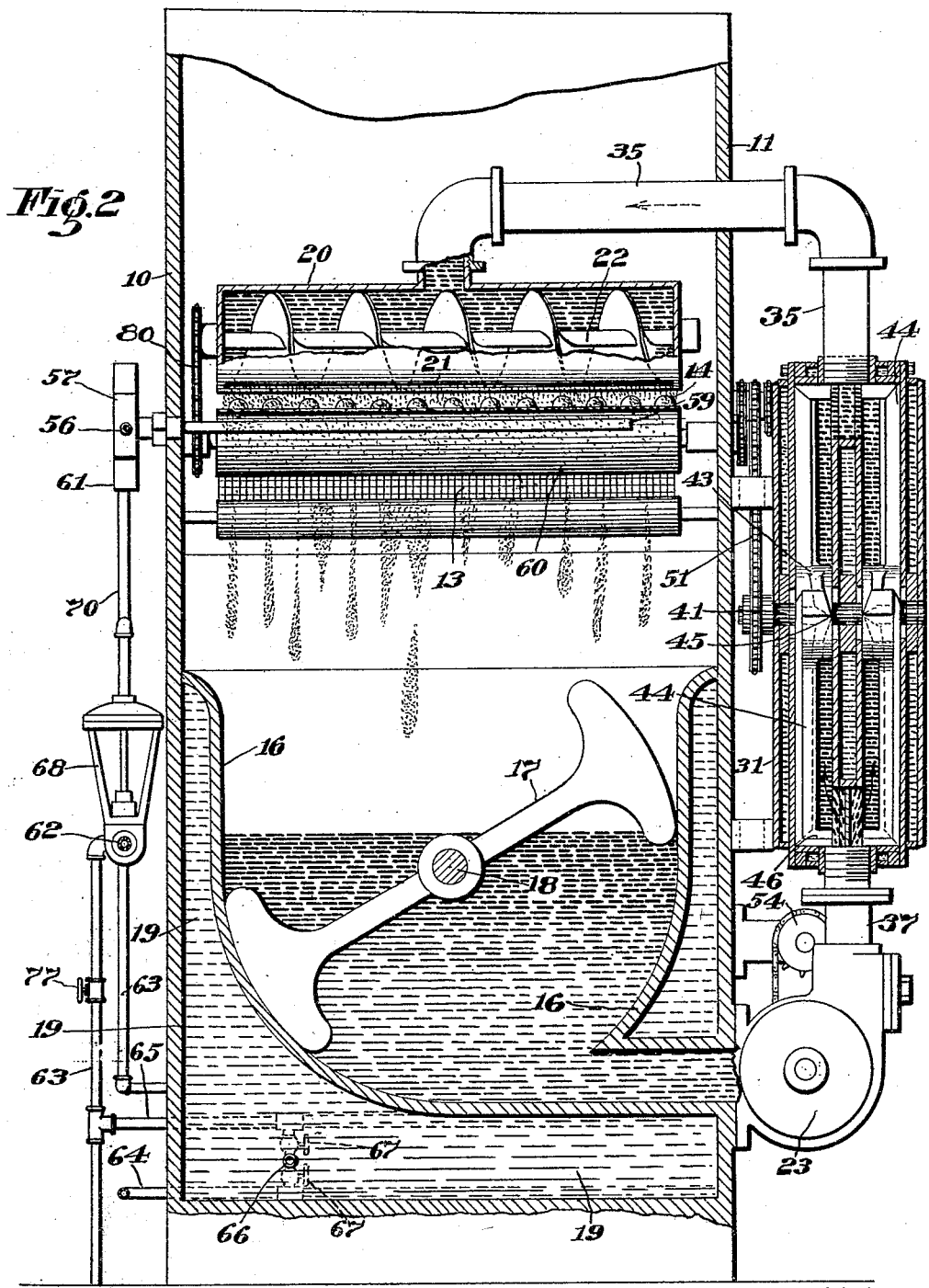

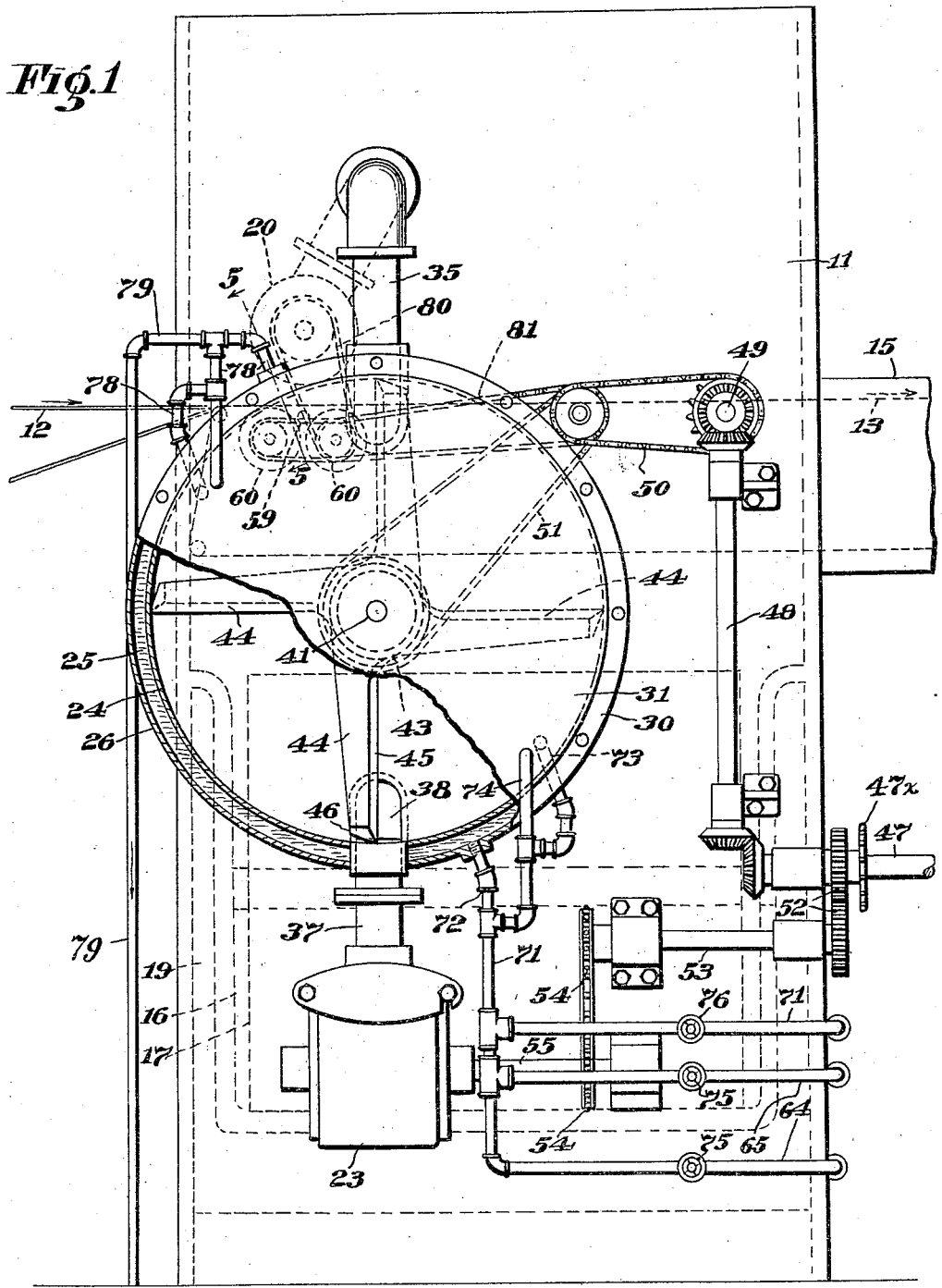

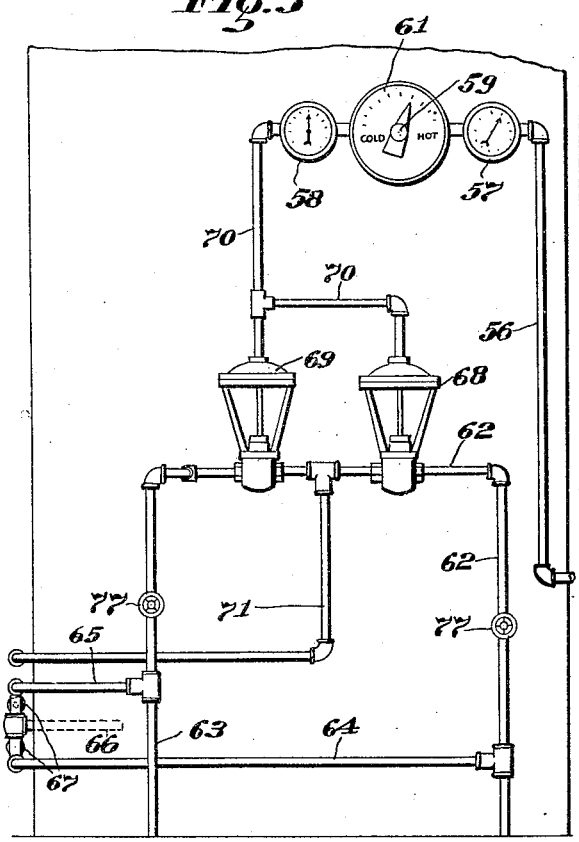
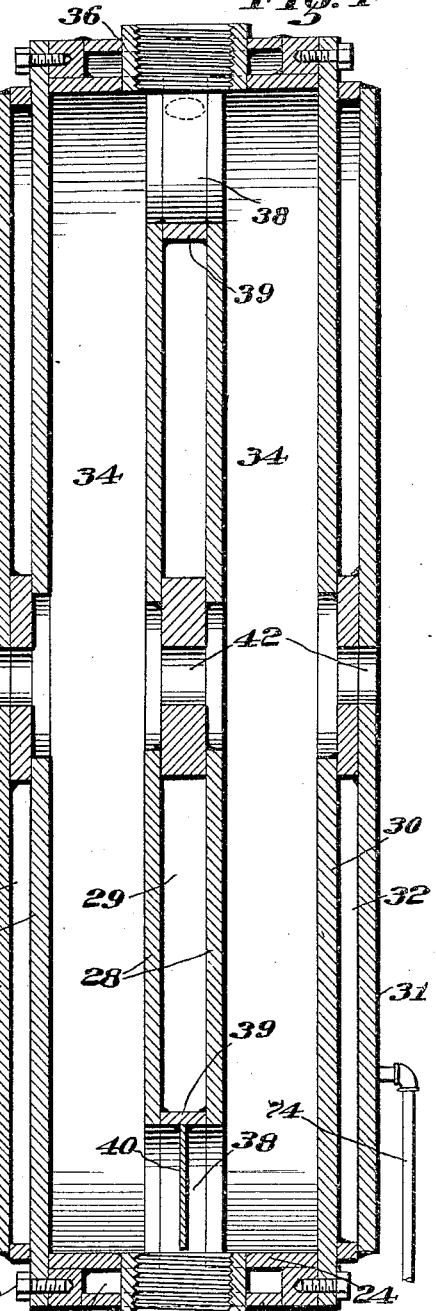

Patented Feb. 21, 1933

1,898,829

UNITED STATES PATENT OFFICE

FREDERICK W. GREER, OF CAMBRIDGE, MASSACHUSETTS

TEMPERING DEVICE

Application filed April 25, 1930. Serial No. 447,134.

This invention relates to the tempering of chocolate and other coating or confection forming materials, and while the invention pertains more particularly to the coating of confections the tempering device of the present invention may be employed for various purposes.

In coating confections with chocolate it is important that the temperature at which the chocolate coating is applied to the "centres", such as cakes or candies, be accurately controlled, because slight changes in the temperature of the coating material will produce changes in the appearance of the finished confections.

In operating confection coating machines it is comparatively easy to raise the temperature of the coating material since this may be accomplished by delivering steam to a jacketed receptacle containing the coating material, but it is more difficult to reduce the temperature of hot chocolate due to the high latent heat of chocolate and also to its tendency to freeze or harden upon the cooling surface and form an insulating layer that obstructs or completely closes the chocolate passage.

It has been proposed heretofore to regulate the temperature of chocolate by passing the hot chocolate through a jacketed pipe or conduit having a rotating scraper that scrapes the chilled chocolate from the walls of the pipe, and while this proposed construction works very well to reduce the temperature of the chocolate slightly, it does not afford a sufficient amount of cooling surface to quickly reduce the temperature of a flowing stream of chocolate several degrees.

In practice it is found highly desirable to maintain the chocolate in the supply tank at a temperature several degrees above the temperature at which the chocolate is deposited upon the confections, as this gives a better gloss to the finished goods, and keeps the chocolate in the supply tank well melted so that it will not build up the stirrer. When however the chocolate is maintained at this increased temperature in the supply tank it is necessary to provide means for rapidly cooling the chocolate several degrees as it is pumped from the supply tank to the shower pan.

It has, therefore, been attempted heretofore to rapidly cool a stream of chocolate by passing the chocolate through a series of jacketed pipes each having a rotating stirrer, but such a construction is bulky and expensive to manufacture and difficulties are experienced in operating the scrapers.

Having in mind the foregoing the present invention relates to a tempering device which is simple and compact in construction and which affords a large area of cooling surface that is kept free from solidified chocolate by rotating scrapers.

An important feature of the present invention resides in a closed receptacle having jacketed side walls of relatively large area disposed in close relation to each other to provide a narrow chocolate receiving space between them, and provided with a rotating scraper for scraping the chocolate from the cooling walls.

A more specific feature of the invention resides in a jacketed drum-like receptacle provided with a central partition and a narrow chocolate receiving chamber at each side of the partition, and also provided with rotating scrapers for scraping the walls of the chocolate chambers.

Still a further feature of the invention resides in a coating machine having a pump for delivering the coating materials from the supply tank to the shower pan, and provided with a tempering device interposed between the supply tank and shower pan so that the coating material may be forced therethrough under pressure and comprising a narrow jacketed, drum-like receptacle provided with a rotating scaper.

Other features of the invention and novel combination of parts in addition to the above will be hereinafter described in connection with the accompanying drawings which illustrate one good practical form of the invention.

In the drawings:—

Fig. 1 is a side elevation of a chocolate coating machine having associated therewith a tempering device constructed in accordance with the present invention.

Fig. 2 is a transverse vertical sectional view through the coating machine of Fig. 1;

Fig. 3 on a reduced scale is a side elevation of the opposite side of the machine of Fig. 1;

Fig. 4 on an enlarged scale is a vertical sectional view through the tempering device of the present invention; and Fig. 5 is a view similar to Fig. 4 but taken on the line 5—5 of Fig. 1.

The tempering device of the present invention may be employed for various purposes but is particularly well adapted for use for tempering chocolate, and as above stated is shown in connection with a confection coating machine, which for the most part is similar in construction and operation to the chocolate coating machine shown and described in my copending application Ser. No. 331,434, filed January 10, 1929, which has matured into Patent No. 1,828,405 issued Oct. 20, 1931.

The coating machine illustrated comprises a closed casing having the opposite side walls 10 and 11 to which the end walls and top of the casing are secured. The candy, cakes or other articles to be coated are delivered to the coating machine by an endless belt or apron 12, which is positioned to deliver such articles to the upper run of a wire conveyor apron 13. The wire apron 13 may be of the usual construction and serves to advance the articles 14 to be coated beneath the coating supplying means to be described, the construction being such that the coated confections are advanced entirely through the coating machine and through the extension 15 at one end thereof by the apron 13.

The excess chocolate or other coating material which passes through the conveyor apron 13 falls into the supply tank 16 in which is mounted the stirrer 17 that is secured to the operating shaft 18. The tank 16 is provided with the water jacket 19 adapted to maintain the coating material within the supply tank 16 at the desired temperature.

The coating material is delivered from the supply tank 16 by means to be described to a receptacle or shower pan 20 supported above the upper run of the conveyor apron 13 and the shower pan shown comprises a closed cylindrical receptacle which is provided at its lower side with one or more discharge slots 21 extending lengthwise of the receptacle so that the coating material may pass through these slots on to the traveling confections 14. Within the cylindrical receptacle or shower pan 20 is provided a screw shaped scraper 22 which serves to scrape the inner face of the slots 21 to keep them free of clogging material and the scraper serves also to mix the chocolate material in the receptacle 20 and break up the lumps therein.

As above stated it is desirable to accurately control the temperature at which the chocolate is delivered to the confections 14 because slight changes in the temperature of the chocolate delivered to the confections will change the appearance of the finished goods. It is also desirable to maintain the chocolate in the supply tank at a temperature of from two to five degrees above the temperature at which the coating material is delivered to the confections. This gives a better gloss, allows the stirrer 17 to mix the chocolate better and prevents the chocolate from building up on the stirrer and other parts with which it comes in contact.

No particular difficulty is experienced in maintaining the large volume of chocolate within the supply tank 16 at a predetermined or desired temperature because the temperature of this large mass of chocolate will not vary rapidly. If, however, the chocolate of the supply tank 16 is maintained at a temperature several degrees higher than the temperature at which the coating material is to be delivered to the confections 14, it is necessary to quickly cool the stream of chocolate delivered from the supply tank 16 by the pump 23 and other connections to be described, to the shower pan 20.

In accordance with the present invention, the means for tempering or reducing the temperature of the chocolate or other coating material discharged from the supply tank 16 consists of a jacketed receptacle having its opposite walls of relatively large area disposed in close proximity to each other so as to provide a narrow passage between these jacketed walls through which the coating material is passed, and the tendency of the chilled chocolate to build up or harden on the walls of the cooling or tempering chamber is prevented by providing a rotating scraper therein which keeps the walls free from chocolate deposits.

The tempering device illustrated in the drawings comprises a jacketed, drum-like receptacle having the annular wall 24 provided with the water jacket 25 and outer wall 26. Within the annular wall 24 is provided the central partition formed of the spaced walls 28 which are maintained in spaced relation to each other to provide the water jacket 29 between these walls. The drum-like receptacle so far described is provided at its opposite sides with the jacketed side walls 30, the outer walls 31 of which are supported in spaced relation to the inner walls 30 to form the water jackets 32 therebetween and the opposite side walls 30 are removably secured in place by the bolts 33.

The construction just described is such that the jacketed receptacle is provided with the narrow chocolate tempering passages 34 and all of the walls forming these passages are jacketed and may be supplied with water at the desired temperature to rapidly change the temperature of the chocolate or other coated material being passed through this tempering device.

The drum-like tempering device of the present invention is conveniently mounted at one side of the coating machine as shown so that it may be interposed between the chocolate supply pump 23 and the upper conduit 35 leading to the shower pan 20, and the tempering device illustrated is provided at its under side with a threaded inlet collar 36 adapted to receive the chocolate supply pipe 37 leading from the pump 23, and the upper side of this receptacle is provided with a similar collar 36 to which the lower end of the pipe 35 is connected.

In order to prevent the central partition 28 from obstructing the flow of the chocolate through the collars 36 the central partition is cut away adjacent these collars by forming the U-shaped openings 38 in the partition as will be apparent from Figs. 1 and 4. The space between the plates 28 adjacent the openings 38 is closed by mounting therein the U-shaped strips 39. It is desirable to deflect part of the stream of chocolate delivered to the tempering device by the pipe 37 into each of the compartments 34 to insure a continuous flow of the stream of chocolate through both of these compartments and this is accomplished by providing the diaphragm or plate 40 in the lower chocolate receiving opening 38.

It is essential in carrying out the present invention that means be provided for preventing the chocolate from building up on the jacketed walls of the receptacle as the temperature of the chocolate is reduced below its melting point and this is accomplished in accordance with the present invention by providing each of the chocolate treating chambers 34 with a scraper adapted to scrape each jacketed wall of the receptacle.

In order to scrape the walls it is important that the chocolate receiving chambers of the tempering device be provided with smooth accurately machined or ground walls, so that the scrapers cooperating with these walls will scrape them clean to keep them free from the chocolate deposits. The entire receptacle of the tempering device is therefore conveniently formed of sheet metal as will be apparent from Figs. 4 and 5, and the various portions are conveniently welded together.

The chocolate scrapers provided in accordance with the present invention to scrape the walls of the chambers 34 are mounted upon and are rigidly secured to the central driving shaft 41 journaled in the bearings 42 formed in the central partition and side walls of the tempering receptacle. Each scraper is provided with a central hub portion 43 having extending therefrom the arms 44 and each arm has a straight scraping edge 45 and is provided at its outer end with an angularly disposed portion 46 adapted to scrape the annular wall of the chocolate chamber. In the construction shown each of these scrapers has four arms disposed at 90 degrees to each other and it should be noted that one pair of diametrically disposed arms of a scraper scrape one side wall of the chamber 34 whereas the other pair of diametrically disposed arms scrape the opposite side wall of this chamber, the arrangement being such that both side walls and the annular wall 24 of each compartment is acted upon by a rotating scraper to prevent the chilled chocolate from depositing upon any of the jacketed walls of the tempering device.

The various operating parts so far described may be driven from the main operating shaft 47 provided at its end with a bevelled gear adapted to engage the cooperating bevelled gear to drive the vertical shaft 48 which in turn drives through the cooperating bevelled gears shown, the transversely extending shaft 49. The shaft 49 may serve to drive the conveyor apron 13, and the scrapers described for the tempering device may be driven from the shaft 49 by the chains 50 and 51. The chocolate pump 23 is driven from the power shaft 47 through the gears 52, auxiliary shaft 53 and sprockets 54, one of which is mounted upon the pump operating shaft 55. The stirrer 17 within the supply tank 16 may be driven from the power shaft 47 by a chain engaging the sprocket 47$^x$ mounted upon the shaft 47.

As above stated it is relatively easy to maintain the chocolate in the supply tank 16 sufficiently close to the desired temperature, and while automatic temperature control means may be provided for regulating the temperature of the water supplied to the jacket 19, hand valves for controlling the supply of cold water and steam delivered to the jacket 19 are usually sufficient.

It is important, however, that the temperature at which the chocolate is delivered to the confections 14 be accurately controlled and it is therefore desirable to provide automatic temperature control means for regulating the temperature of the water supplied to the jackets 25, 29 and 32 of the tempering receptacle. Various means for automatically regulating the temperature of the water supplied to the tempering device may be employed, and the means shown to this end are similar to that shown and described in my co-pending application above referred to.

In the present construction the valves for controlling the supply of cold water and steam to the tempering device are actuated by compressed air in a well-known manner. The compressed air is supplied from any suitable source of air pressure by a pipe 56 having the pressure gauges 57 and 58 disposed at the opposite sides of the temperature regulator or thermostat 59. This thermostat is shown as located below the conveyor apron 13 in the valley between the rollers 60 which serve to build up the supply of chocolate sufficiently to insure coating of the bottoms of the confections 14. As a result of this location of the thermostat 59 it is immersed in the stream of chocolate at the coating applying point. The thermostat control may be adjusted as desired by rotating the hand wheel 61.

The cold water for the various jackets is supplied by the pipe 62 and the steam is supplied by the pipe 63. The temperature of the water in the jacket 19 of the supply tank is controlled by the laterally extending water pipe 64 and the laterally extending steam pipe 65, which are connected to the pipe 66 extending into the jacket 19, and the pipes 64 and 65 are provided with the hand operated valves 67.

The temperature of the water supplied to the water jackets 25, 29 and 32 is controlled by providing the water supply pipe 62 with the direct action diaphragm valve 68 and by providing the steam pipe 63 with the indirect action diaphragm valve 69. These valves which may be of well known construction are operated by the pressure of the air delivered to the diaphragms in the upper part of the valves by the pipe connections 70 leading from the thermostat 59. Water at the desired temperature is supplied to the chocolate tempering device from the valves 68, 69 by the pipe 71 having the branch pipes 72, 73, 74 near its discharge end and leading into the jackets 25 and 32.

At times it may be desirable to manually control the water and steam supplied to the tempering device, and this is accomplished by providing the water pipe 64 and steam pipe 65 with the hand valves 75 and by providing the pipe 71 with the hand valves 76. The pipes leading to the diaphragm valves 68, 69 are provided with the hand valve 77. Water is discharged from the upper portion of the jackets 25, 32 through the branch pipes 78 shown in Fig. 1 as connected to the discharge pipe 79.

The screw scraper or stirrer 22 mounted in the shower pan 20 may be driven by the chain 80, and the rollers 60 are driven by the chain 81.

It will be seen from the foregoing that the tempering device of the present invention, while relatively compact, affords a large amount of jacketed surface area adapted to quickly cool or heat the stream of chocolate or other material passed through the chambers 34, and that the revolving scrapers are so constructed that they effectively scrape all jacketed surfaces of the tempering device. Furthermore the tempering device is so constructed that the walls to be scraped can be accurately grounded or machined to present true accurate surfaces to the rotating scrapers.

What is claimed is:—

1. A device for controlling the temperature of a continuous stream of chocolate, comprising in combination, a closed narrow drum-like receptacle having jacketed disks spaced a short distance apart and a jacketed cylindrical wall connecting said disks to form a narrow circular chamber between the disks for the chocolate, pipes leading to and from the chamber through said jacketed cylindrical wall, means for forcing the chocolate through one pipe into the chamber and out through the other pipe in a continuous stream, means for supplying a heat exchange fluid to the jacketed disks and jacketed cylindrical wall, and rotating scrapers for scraping the inner walls of the jacketed receptacle.

2. A device for controlling the temperature of a continuous stream of chocolate, comprising in combination, a closed narrow drum-like receptacle having jacketed disks spaced a short distance apart and connected to an outer cylindrical wall to form a narrow circular chamber between the disks having smooth finished walls, pipes leading to and from the chamber through said outer cylindrical wall, means for forcing the chocolate through one pipe into the chamber and out through the other pipe in a continuous stream, means for supplying a heat exchange fluid to the jackets, a shaft extending through the receptacle, and scrapers secured thereto and constructed to scrape said finished walls and each scraper having a laterally bent end portion for scraping said cylindrical wall.

3. A device for controlling the temperature of a continuous stream of chocolate, comprising in combination, a closed narrow drum-like receptacle having jacketed disks spaced a short distance apart and connected by an outer cylindrical wall to form a narrow circular chamber between the disks for the chocolate, pipes leading to and from the chamber through said outer cylindrical wall, means for forcing the chocolate through one pipe into the chamber and out through the other pipe in a continuous stream, means for supplying a heat exchange fluid to the jackets, and rotating scrapers constructed to scrape the inner walls of the jacketed receptacle.

In testimony whereof, I have signed my name to this specification.

FREDERICK W. GREER.